United States Patent
Loldj et al.

(10) Patent No.: US 7,522,974 B2
(45) Date of Patent: Apr. 21, 2009

(54) INTERFACE FOR OPERATING AND MONITORING ABATEMENT SYSTEMS

(75) Inventors: Youssef A. Loldj, Sunnyvale, CA (US); Shaun W. Crawford, San Ramon, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 11/844,272

(22) Filed: Aug. 23, 2007

(65) Prior Publication Data

US 2008/0051944 A1 Feb. 28, 2008

Related U.S. Application Data

(60) Provisional application No. 60/823,294, filed on Aug. 23, 2006.

(51) Int. Cl.
*G05D 11/02* (2006.01)
*G06F 3/04* (2006.01)

(52) U.S. Cl. ............... 700/282; 423/210; 715/771; 156/345.29; 118/715

(58) Field of Classification Search ............... 700/282; 715/771; 156/345.24, 345.29; 422/198, 422/211; 423/210
See application file for complete search history.

(56) References Cited

U.S. PATENT DOCUMENTS

| | | | |
|---|---|---|---|
| 5,649,985 A | 7/1997 | Imamura | |
| H1701 H * | 1/1998 | DePinto et al. | ........ 156/345.24 |
| 6,234,787 B1 | 5/2001 | Endoh et al. | |
| 6,261,524 B1 | 7/2001 | Herman et al. | |
| 6,322,756 B1 | 11/2001 | Arno et al. | |
| 6,338,312 B2 | 1/2002 | Hayes et al. | |
| 6,491,884 B1 | 12/2002 | Faller et al. | |
| 6,805,728 B2 | 10/2004 | Sweeney et al. | |
| 6,813,943 B2 | 11/2004 | Smith et al. | |
| 6,824,748 B2 * | 11/2004 | Kaushal et al. | ............. 422/198 |
| 6,843,830 B2 | 1/2005 | Sherer | |
| 2002/0066535 A1 * | 6/2002 | Brown et al. | ............. 156/345.29 |
| 2002/0182131 A1 * | 12/2002 | Kaushal et al. | ............. 422/198 |
| 2004/0001787 A1 * | 1/2004 | Porshnev et al. | ............. 423/210 |
| 2004/0213721 A1 | 10/2004 | Arno et al. | |
| 2004/0216610 A1 | 11/2004 | Tom et al. | |
| 2006/0104879 A1 | 5/2006 | Chiu et al. | |

FOREIGN PATENT DOCUMENTS

| EP | 0694735 | 1/1996 |
|---|---|---|
| JP | 2001-082723 | 3/2001 |
| WO | WO2008/070096 A1 | 6/2008 |

* cited by examiner

*Primary Examiner*—Albert DeCady
*Assistant Examiner*—Douglas S Lee
(74) *Attorney, Agent, or Firm*—Dugan & Dugan, PC (57) ABSTRACT

Method and systems are provided for monitoring and controlling one or more abatement systems. One or more abatement systems may be represented on a display alone with one or more effluent flows from processing tools. A selected effluent flow configuration is received. An interface manifold is controlled to implement the selected effluent flow configuration. Numerous other aspects are provided.

29 Claims, 7 Drawing Sheets

INTERFACE FOR OPERATING AND MONITORING ABATEMENT SYSTEMS

The present application claims priority from U.S. Provisional Patent Application Ser. No. 60/823,294, filed Aug. 23, 2006, entitled "SYSTEM FOR MONITORING MULTIPLE ABATEMENT SYSTEMS AND METHOD OF USING THE SAME".

CROSS-REFERENCE TO RELATED APPLICATIONS

The present application is related to the following commonly-assigned, co-pending U.S. patent applications, which are hereby incorporated herein by reference in their entirety for all purposes:

U.S. Provisional Patent Application Ser. No. 60/823,292 filed Aug. 23, 2006, entitled "ABATEMENT SYSTEM WITH BACK-UP FUNCTIONALITY AND METHOD OF USING THE SAME"; and U.S. patent application Ser. No. 11/844,268 filed Aug. 23, 2007, entitled "SYSTEMS AND METHODS FOR OPERATING AND MONITORING ABATEMENT SYSTEMS".

FIELD OF THE INVENTION

The present invention relates to semiconductor device manufacturing, and more particularly to methods and systems for monitoring multiple abatement systems.

BACKGROUND

The gaseous effluents from the manufacturing of semiconductor materials, devices, products and memory articles involve a wide variety of chemical compounds used and produced in the process facility. These compounds include inorganic and organic compounds, breakdown products of photoresist and other reagents, and a wide variety of other gases that must be removed from the waste gas before being vented from the process facility into the atmosphere.

Semiconductor manufacturing processes utilize a variety of chemicals, many of which have extremely low human tolerance levels. During processing (e.g. physical vapor deposition, diffusion, etch PFC processes, epitaxy, etc.), some of the tools used (e.g., chemical vapor deposition chamber, chemical mechanical polishing chamber, diffusion, etc.) as well as the processes may produce undesirable byproducts including, for example, perfluorocompounds (PFCs) or byproducts that may decompose to form PFCs. PFCs are recognized to be strong contributors to global warming.

These undesirable byproducts may be removed from the effluent streams via an abatement system. The abatement system may convert gases produced by the processing of substrates and flat panel display/LCD to less environmentally harmful versions to be emitted to the environment. The abatement systems may be coupled to semiconductor manufacturing tools, and typically may abate the process gases from the tool as they are produced. A need exists for an interface for operating and monitoring the abatement systems.

SUMMARY OF THE INVENTION

In aspects of the invention, a method is provided for monitoring and controlling one or more abatement systems. The method includes the steps of (1) representing on a display one or more abatement systems; (2) representing on the display one or more effluent flows from processing tools; (3) representing on the display a plurality of effluent flow configuration options; (4) receiving a selected effluent flow configuration; and (5) controlling an interface manifold to implement the selected effluent flow configuration.

In other aspects of the invention, a method is provided for monitoring and controlling one or more abatement systems. The method includes the steps of (1) representing on a display one or more abatement systems; (2) representing on the display one or more effluent flows from processing tools; (3) receiving a selection indicating a back-up effluent flow configuration, wherein a first subset of the one or more abatement systems is selected as a primary abatement system and a second subset of the one or more abatement systems is selected as a back-up abatement system; (4) directing one or more effluent flows to the one or more primary abatement systems; (5) placing one or more back-up abatement systems in a stand-by mode; and (6) configuring an interface manifold to redirect the effluent flow from the one or more primary abatement systems to the one or more back-up abatement systems based on a status of the primary abatement system.

In yet other aspects of the invention, a method is provided for monitoring and controlling one or more abatement systems. The method includes the steps of (1) representing on a display one or more abatement systems; (2) representing on the display one or more effluent flows from processing tools; (3) receiving a selection indicating a redundant effluent flow configuration, wherein at least a first abatement system of the one or more abatement systems receives one or more effluent flows from processing tools and at least a second abatement system of the one or more abatement systems receives one or more effluent flows from processing tools; and (4) configuring an interface manifold to redirect the one or more effluent flows from an off-line abatement system to an operational abatement system based on the status of the off-line abatement system.

In still other aspects of the invention, a method is provided for monitoring and controlling one or more abatement systems. The method includes the steps of (1) representing on a display one or more abatement systems; (2) representing on the display one or more effluent flows from processing tools; (3) receiving a selection indicating a load-balancing effluent flow configuration; and (4) configuring an interface manifold to direct the effluent flows to the one or more abatement systems based on at least one efficiency criteria.

In yet still other aspects of the invention, a method is provided for monitoring and controlling one or more abatement systems. The method includes the steps of (1) representing on a display one or more abatement systems; (2) representing on the display one or more effluent flows from processing tools; (3) receiving a selection indicating an application specific effluent flow configuration; (4) configuring an interface manifold to direct a first effluent flow to a first abatement system, wherein the first effluent flow is from a first process; and (5) configuring an interface manifold to direct a second effluent flow to a second abatement system, wherein the second effluent flow is from a second process.

Other features and aspects of the present invention will become more fully apparent from the following detailed description, the appended claims and the accompanying drawings.

DETAILED DESCRIPTION

The present invention provides systems and methods for monitoring and controlling one or more abatement systems as a single integrated system. The invention enables automated monitoring, tracking and manipulation of the abatement systems as well as the flow of effluent streams from electronic manufacturing tools to the abatement systems. For example, in a system with two operating abatement systems, an operator via a software interface to a system controller may review the effluent flowing into each of the abatement systems and determine that only one of the abatement systems is needed to accommodate the effluent flow at this time. The operator may then enter the appropriate changes into the system using the interface such that the second abatement system is placed in a stand-by mode and the effluent originally flowing to this second abatement system is directed to the first abatement system. Alternatively, the system controller may be configured to automatically use the abatement systems, e.g., in the most efficient manner possible.

In some embodiments, the present invention enables the operator to manipulate flows to the abatement systems via an interface manifold that may include a series of electronically controlled valves adapted to open, close, and/or switch channels between one or more electronic device processing tools and one or more abatement systems. The interface manifold may be coupled to and operated by a controller that receives information from the interface manifold, the operator, the processing tools and abatement systems. In some embodiments, the information may be reviewed by the operator, who then may send an instruction to the interface manifold via the controller. Alternatively, the controller may automatically operate the interface manifold based on information received from the interface manifold, the operator, the processing tools and the abatement systems.

The system controller may permit the easy selection and implementation of a number of pre-defined or operator designed effluent flow configurations. For example, the pre-designed effluent flow configurations may include a back-up configuration, a redundancy configuration, a load balancing configuration and an application specific configuration. These flow configuration types are described in detail below.

Figure 1:
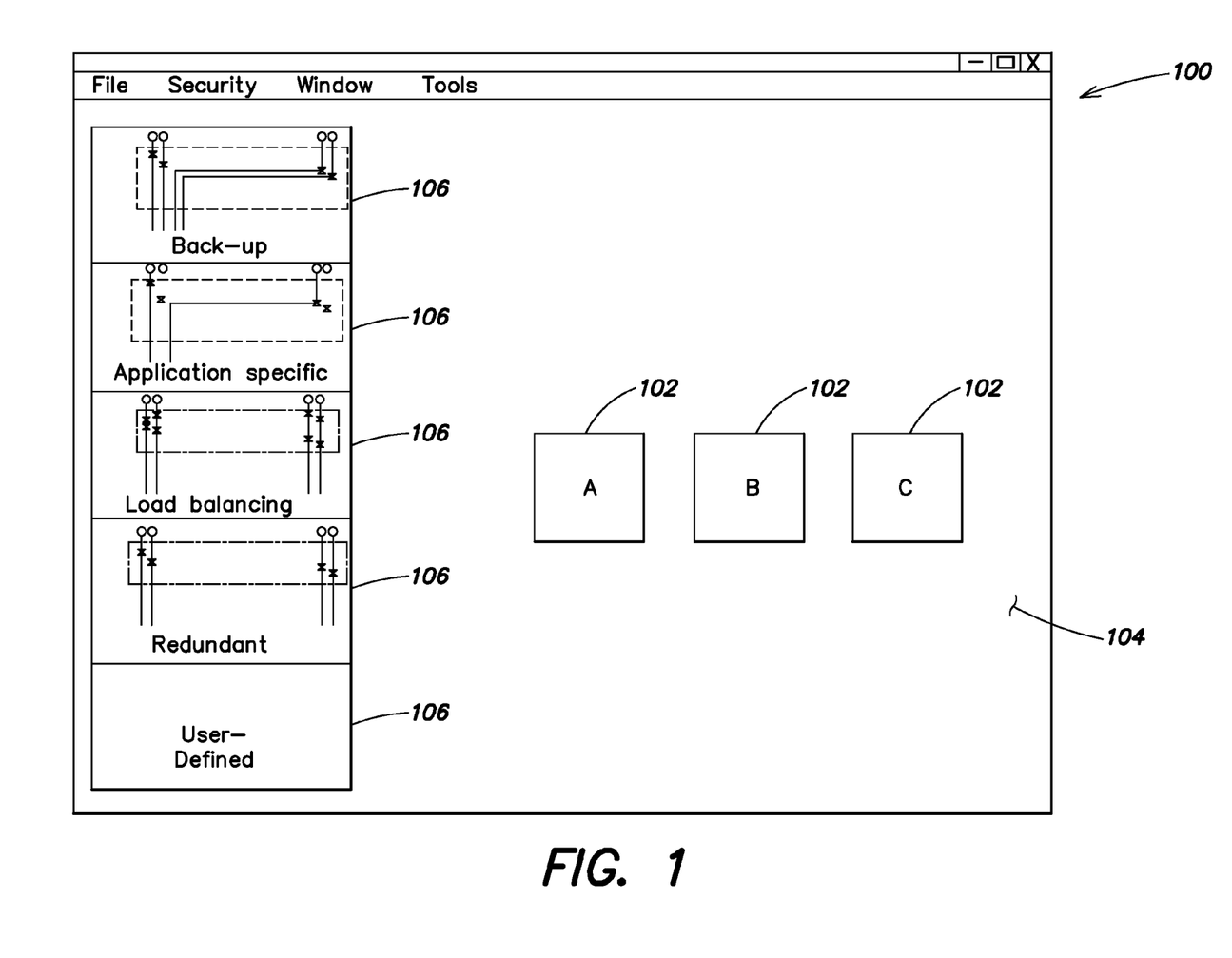
FIG. 1 is a schematic diagram of a system for monitoring and controlling one or more abatement systems in accordance with an embodiment of the present invention.

Turning to FIG. 1, a schematic illustration of a user interface 100 is depicted. The user interface may be implemented on a standard PC using standard operating systems. Alternatively, the user interface may be implemented on a controller, as described in U.S. Patent Application Ser. No. 60/823,292 filed Aug. 23, 2006, entitled "ABATEMENT SYSTEM WITH BACK-UP FUNCTIONALITY AND METHOD OF USING THE SAME", hereby incorporated by reference in its entirety. The user interface 100 may include a representation of one or more selectively interactive abatement systems 102 on a display 104. Three abatement systems 102 are shown herein, but this is for exemplary purposes only, and any number of abatement systems 102 being monitored may be displayed. Each abatement system 102 may have a specific (e.g., static) IP address and may be connected through a hub to the single integrated system at, for example, a PC, server, etc.

The user interface 100 may also include a representation of one or more effluent flow configurations 106 that may be applied to each of the abatement systems 102. The effluent flow configurations may include, for example, a back-up effluent flow configuration, an application specific effluent flow configuration, a load balancing effluent flow configuration, a redundant effluent flow configuration and a user-defined effluent flow configuration. The effluent flow configuration 106 applied to the displayed abatement systems 102A-C may be highlighted or indicated by some other means. The effluent flow configurations will be explained in more detail below.

An operator (not shown) may use the user interface 100 to remotely monitor each of the abatement systems 102 installed in a fabrication system which are communicatively coupled to the system. The operator may monitor and track different parameters (described in FIG. 2), as well as manipulate the parameters of each of the abatement systems 102. In some embodiments if the operator selects a first abatement system 102A, a display with information particular to that abatement system 102A is populated, as shown in FIG. 2.

Figure 2:
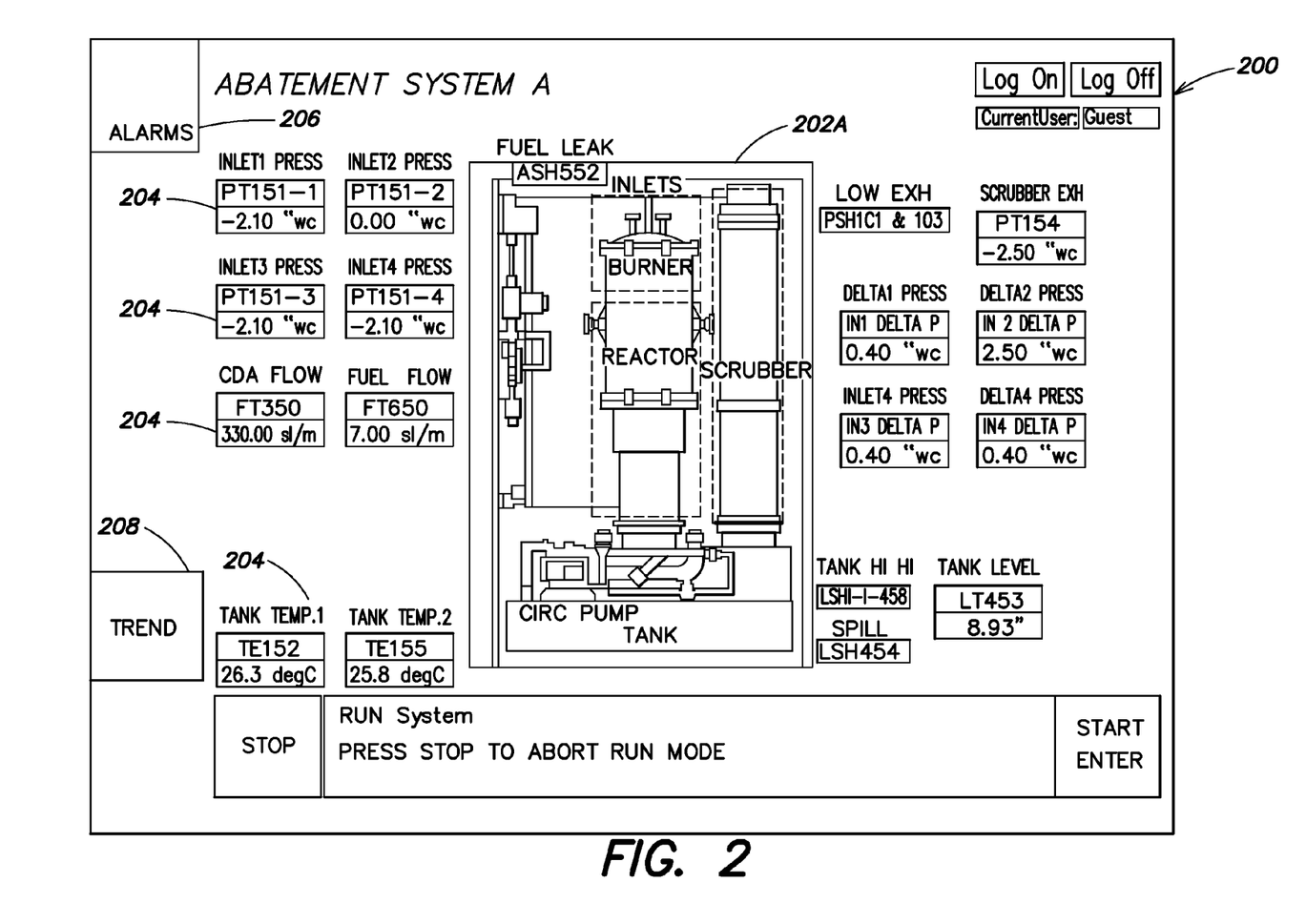
FIG. 2 is a schematic diagram of a system for monitoring and controlling one or more abatement systems in accordance with an embodiment of the present invention.

Turning to FIG. 2, a schematic illustration of a display 200 representing the first abatement system 102A selected in FIG. 1 is depicted. As shown herein, a pictorial representation of the abatement system 202A is displayed. Other representations may be used. A plurality of parameter information 204 related to the abatement system 202A may be displayed. The parameter information 204 may include, for example, the pressure at each of the inlets of the abatement system 202A, the CDA flow rate, the fuel flow rate, tank temperatures, pressure changes for each of the inlets, tank levels, scrubber exhaust pressures, etc. The operator may selectively manipulate the plurality of parameters to alter the functioning of the abatement system 202A.

The display 200 may also include an alarm indicator 206. By selecting the alarm indicator 206, the operator may view all existing alarms and warnings associated with the selected abatement system 202A. The operator may view the alarms by type (e.g., alarms, warnings, etc.) or by abatement system 202A. The operator may also view the alarm history of the given abatement system 202A. The alarms, warnings, or other related events may be saved locally on a PC, for example as a text file, automatically saved on a remote server, or saved on the controller.

The display 200 may also include a trend indicator 208. By selecting the trend indicator 208, the operator may view the history trending of the abatement system 202A. For example, all of the analog values from sensors located at the abatement systems 102A-C may be logged on a specific rate. The operator may select individual sensors and adjust both their minimum and maximum ranges such that trends may be scaled and plotted on a trend display.

Additionally, the data for each of the abatement systems 202A may be exported as a common separated value file (e.g., CSV, etc.) which is compatible with the other tools (e.g., Excel, etc.) coupled with the integrated system.

Figure 3:
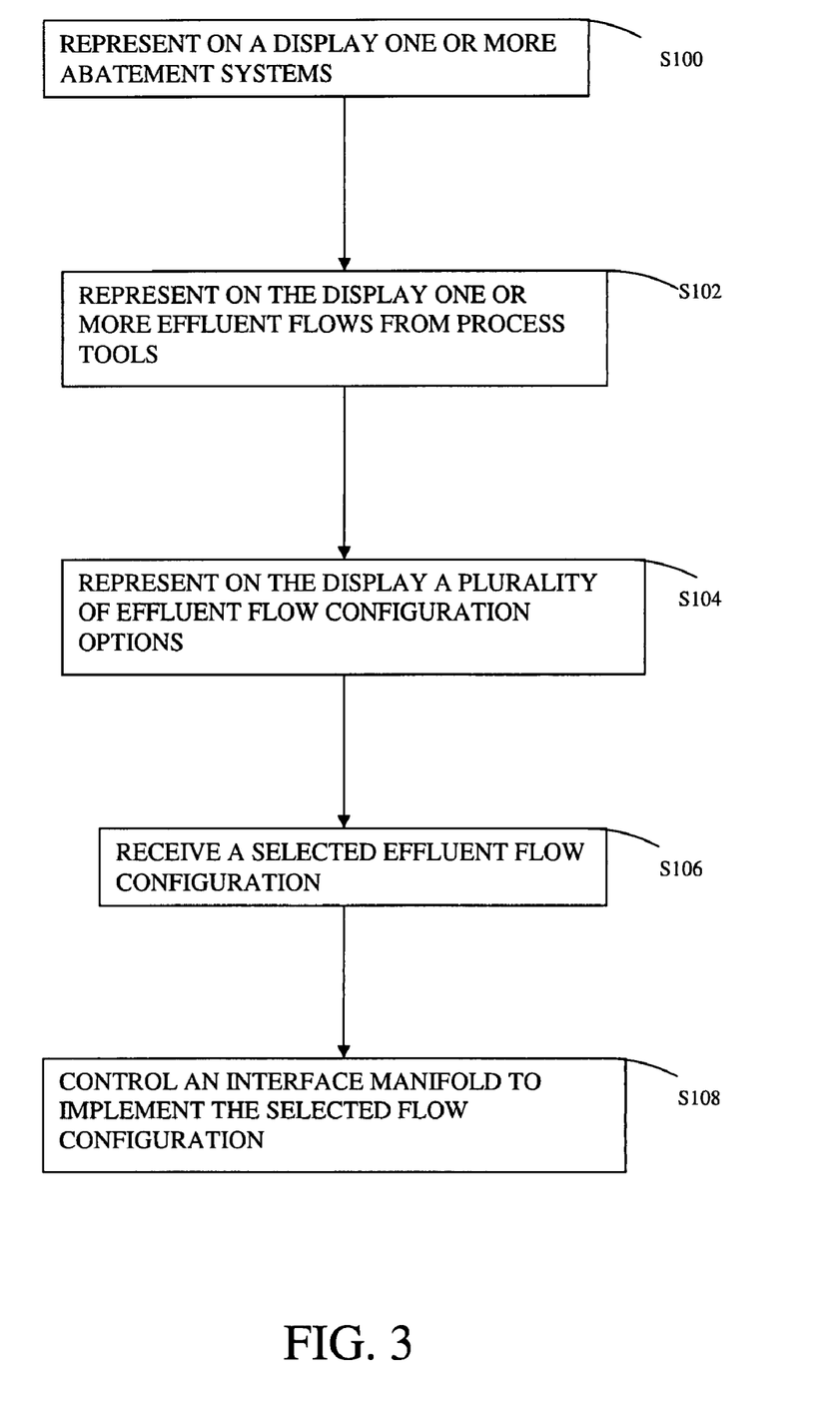
FIG. 3 is a flowchart illustrating an exemplary method for monitoring and controlling one or more abatement systems in accordance with an embodiment of the present invention.

Turning to FIG. 3, a flowchart illustrating an exemplary method for monitoring and controlling one or more abatement systems is depicted. In step S100 one or more abatement systems are represented on a display. One or more effluent flows from process tools are represented on a display in step S102. Additionally, one or more channels to deliver one or more effluent flows to one or more abatement systems may be represented on a display. In step S104, a plurality of effluent flow configuration options is represented on a display. The effluent flow configurations may include a user-designed configuration, a back-up configuration, a redundant configuration, a load-balancing configuration and an application specific configuration. Then in step S106, a selection indicating an effluent flow configuration is received. Optionally, one or more channels to deliver one or more effluent flows to one or more abatement systems reflecting the selected effluent flow configuration may be represented on a display. A plurality of valves in an interface manifold are controlled to implement the selected effluent flow configuration in step S108.

Figure 4:
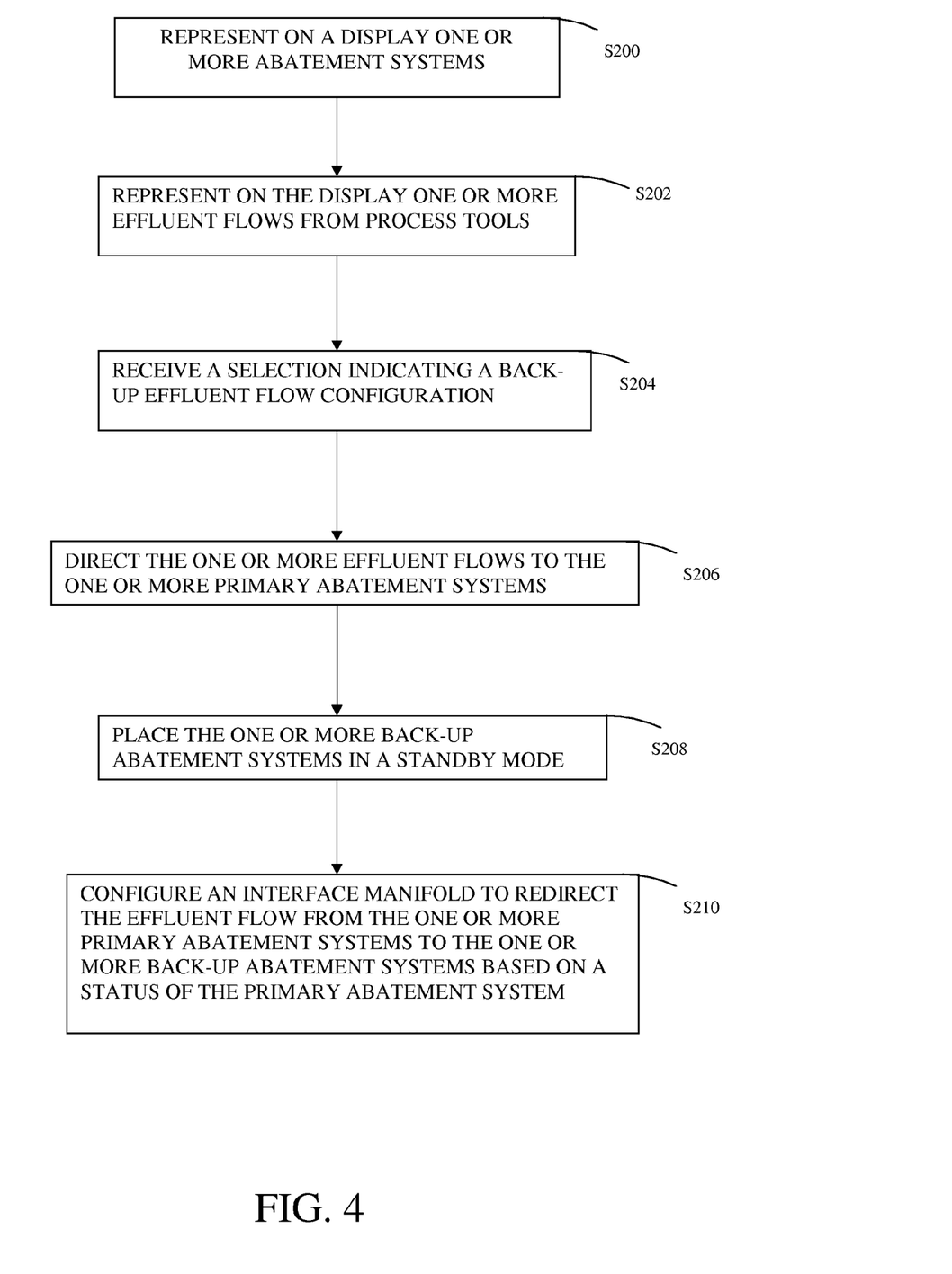
FIG. 4 is a flowchart illustrating an exemplary method for monitoring and controlling one or more abatement systems in accordance with an embodiment of the present invention.

Turning to FIG. 4, a flowchart illustrating an exemplary method for monitoring and controlling one or more abatement systems is depicted. In step S200 one or more abatement systems are represented on a display. One or more effluent flows from process tools are represented on a display in step S202. Additionally, one or more channels to deliver one or more effluent flows to one or more abatement systems may be represented on a display. In step S204, a selection indicating a back-up effluent flow configuration is received. One or more abatement systems are selected as primary abatement systems and one or more abatement systems are selected as back-up abatement systems. The selection of the one or more abatement systems as primary or back-up may be based on a plurality of parameters. These primary and back-up abatement systems may also be represented on the display. Optionally, one or more channels to deliver one or more effluent flows to one or more abatement systems reflecting the selected effluent flow configuration may be represented on a display. Then in step S206, one or more effluent flows are directed to one or more primary abatement systems. One or more back-up abatement systems are placed in a stand-by mode in step S208. Then in step S210, an interface manifold is configured to redirect the effluent flow from the one or more primary abatement systems to the one or more back-up abatement systems based on a status of the primary abatement system. The status may indicate that the primary abatement system has gone offline. The updated status of the primary and back-up abatement systems may also be represented on a display.

Figure 5:
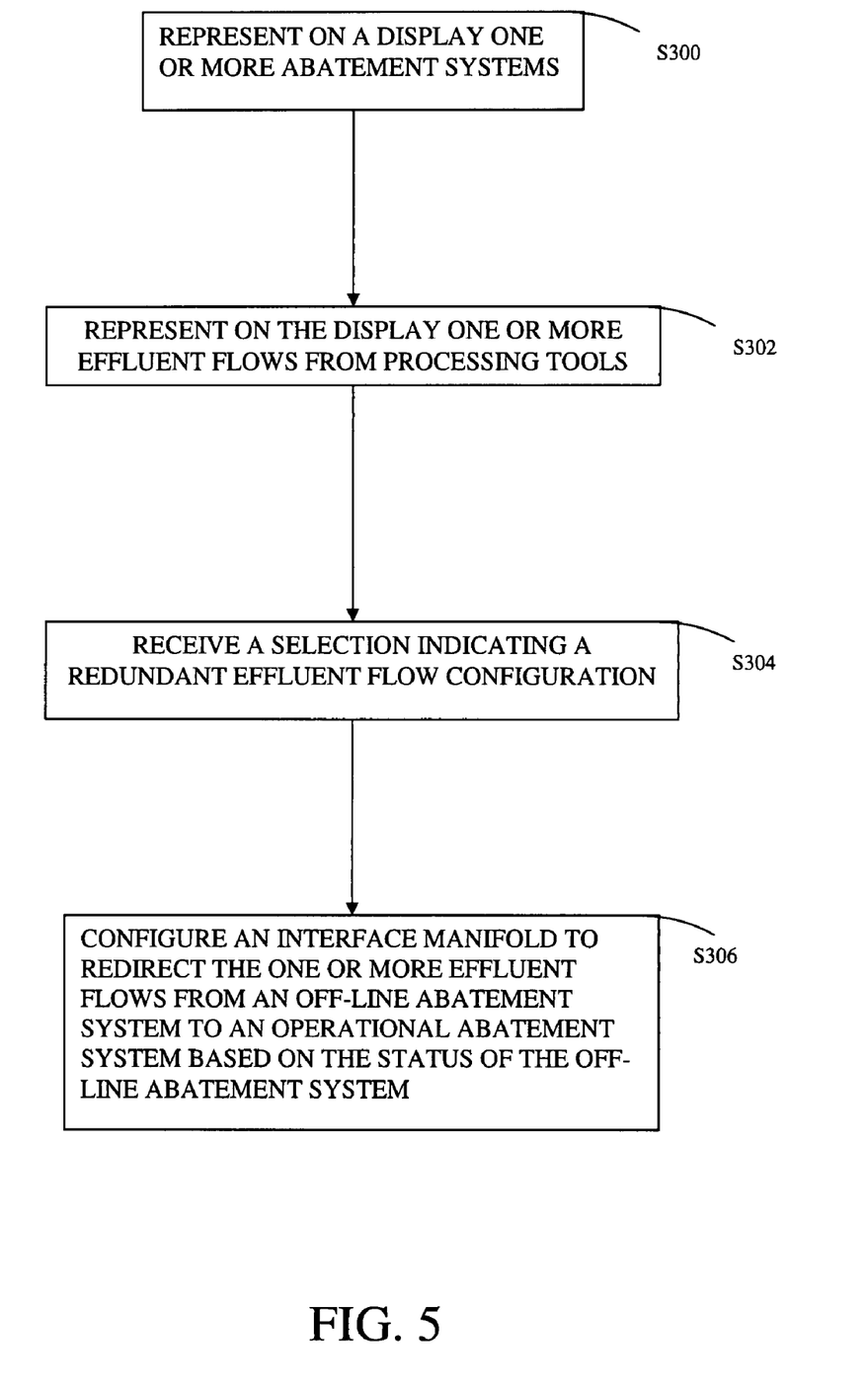
FIG. 5 is a flowchart illustrating an exemplary method for monitoring and controlling one or more abatement systems in accordance with an embodiment of the present invention.

Turning to FIG. 5, a flowchart illustrating an exemplary method for monitoring and controlling one or more abatement systems is depicted. In step S300 one or more abatement systems are represented on a display. One or more effluent flows from process tools are represented on a display in step S302. Additionally, one or more channels to deliver one or more effluent flows to one or more abatement systems may be represented on a display. In step S304, a selection indicating a redundant effluent flow configuration is received. Optionally, one or more channels to deliver one or more effluent flows to one or more abatement systems reflecting the selected effluent flow configuration may be represented on a display. At least a first abatement system of one or more abatement systems receives one or more effluent flows from processing tools and at least a second abatement system of one or more abatement systems receives one or more effluent flows from processing tools. At least one of the first and second abatement systems may go off-line. The updated status of the operational and off-line abatement systems may be represented on a display. In step S306, an interface manifold is configured to redirect one or more effluent flows from an off-line abatement system to an operational abatement system based on the status of the off-line abatement system.

Figure 6:
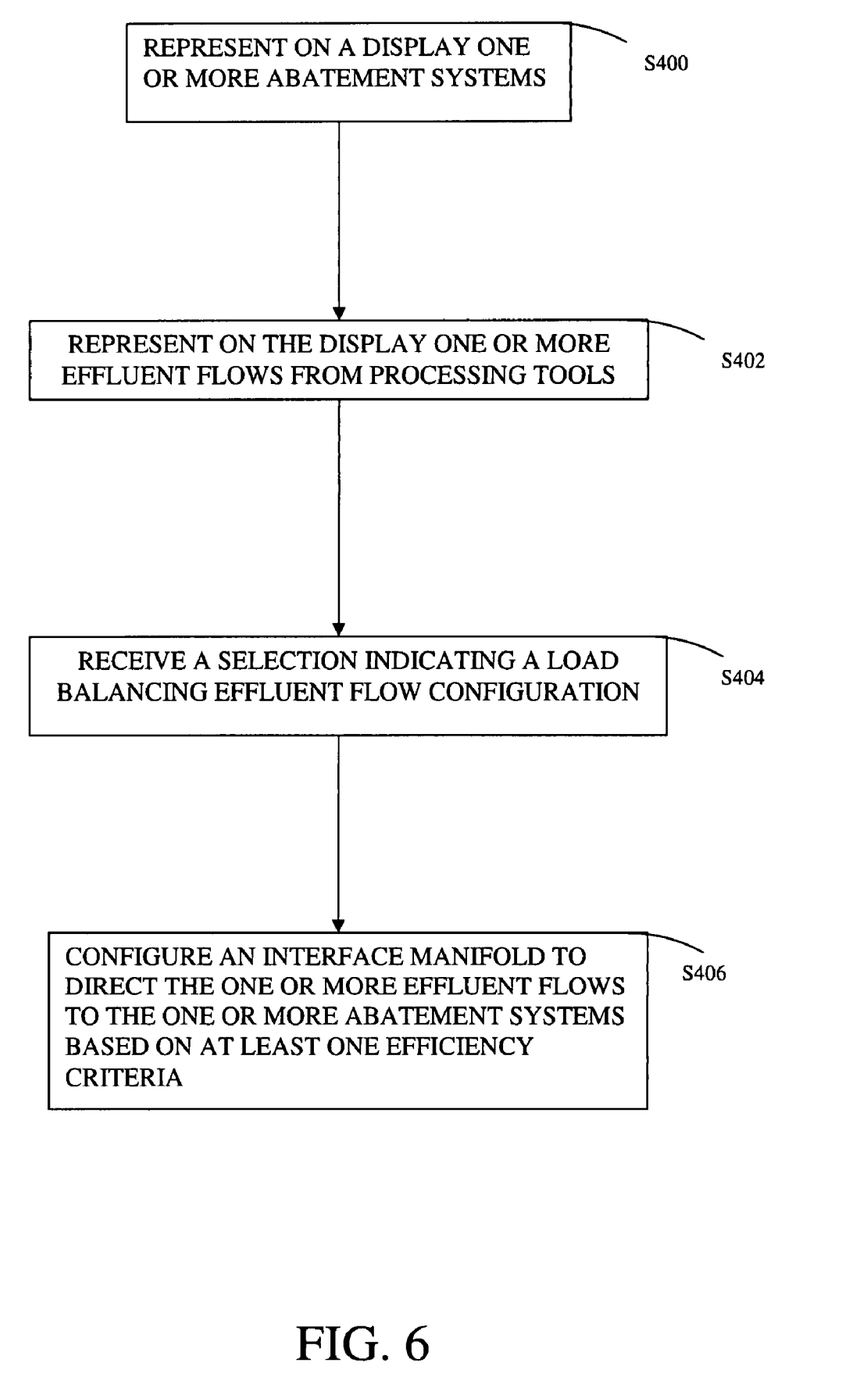
FIG. 6 is a flowchart illustrating an exemplary method for monitoring and controlling one or more abatement systems in accordance with an embodiment of the present invention.

Turning to FIG. 6, a flowchart illustrating an exemplary method for monitoring and controlling one or more abatement systems is depicted. In step S400 one or more abatement systems are represented on a display. One or more effluent flows from process tools are represented on a display in step S402. Additionally, one or more channels to deliver one or more effluent flows to one or more abatement systems may be represented on a display. In step S404, a selection indicating a load-balancing effluent flow configuration is received. Optionally, one or more channels to deliver one or more effluent flows to one or more abatement systems reflecting the selected effluent flow configuration may be represented on a display. Then in step S406, an interface manifold is configured to direct the effluent flows to one or more abatement systems based on an efficiency criteria. Each abatement system may have an associated operational cost, and the efficiency criteria may include for example, a least cost for abating a given effluent flow, a least amount of resources for abating a given effluent flow and a least amount of time for abating a given effluent flow. One or more abatement systems receiving the effluent flow may be represented on the display.

Figure 7:
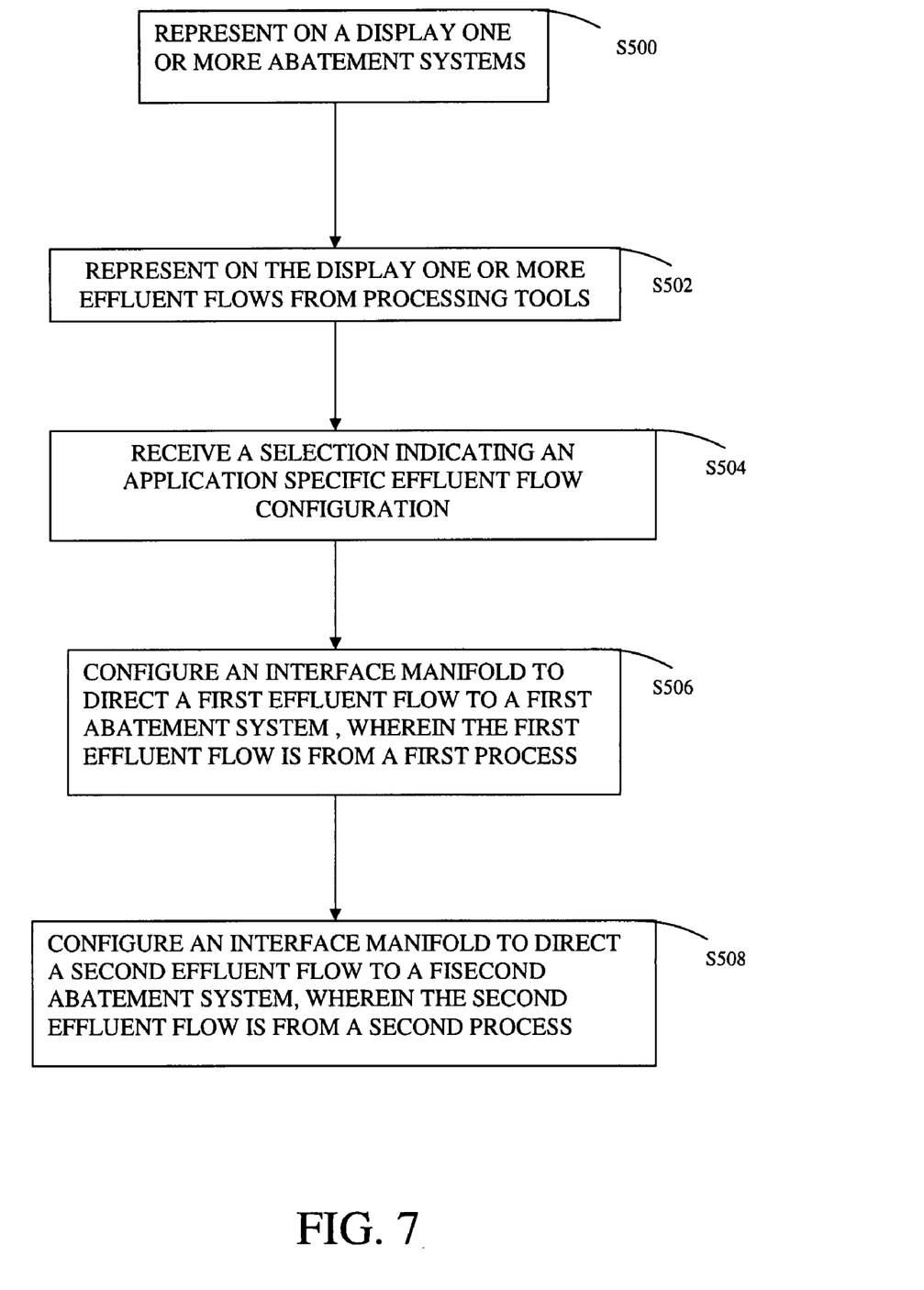
FIG. 7 is a flowchart illustrating an exemplary method for monitoring and controlling one or more abatement systems in accordance with an embodiment of the present invention.

Turning to FIG. 7, a flowchart illustrating an exemplary method for monitoring and controlling one or more abatement systems is depicted. In step S500 one or more abatement systems are represented on a display. One or more effluent flows from process tools are represented on a display in step S502. Additionally, one or more channels to deliver one or more effluent flows to one or more abatement systems may be represented on a display. In step S504, a selection indicating an application specific effluent flow configuration is received. An interface manifold is configured to direct a first effluent flow to a first abatement system in step S506. The first effluent flow may be from a first process. Then in step S508, the interface manifold is configured to direct a second effluent flow to a second abatement system. The second effluent flow may be from a second process. The first and second process may be similar or different. For example, the first process may be a substrate manufacturing process, while the second process may be a process chamber cleaning process. Optionally, one or more channels to deliver one or more effluent flows to one or more abatement systems reflecting the selected effluent flow configuration may be represented on a display.

The foregoing description discloses only exemplary embodiments of the invention. Modifications of the above disclosed system and methods which fall within the scope of the invention will be readily apparent to those of ordinary skill in the art. In some embodiments, the system and methods of the present invention may be applied to semiconductor device processing and/or electronic device manufacturing.

Accordingly, while the present invention has been disclosed in connection with exemplary embodiments thereof, it should be understood that other embodiments may fall within the spirit and scope of the invention, as defined by the following claims.

The invention claimed is:

1. A method for monitoring and controlling one or more abatement systems comprising:
   representing on a display one or more abatement systems;
   representing on the display one or more effluent flows from processing tools;
   representing on the display a plurality of effluent flow configuration options;
   receiving a selected effluent flow configuration; and
   controlling an interface manifold to implement the selected effluent flow configuration.

2. The method of claim 1, wherein the interface manifold includes a plurality of valves adapted to implement the selected effluent flow configuration.

3. The method of claim 1 further comprising: representing on the display one or more channels to deliver the one or more effluent flows to the one or more abatement systems.

4. The method of claim 3 further comprising: representing on the display the one or more channels to deliver the one or more effluent flows to the one or more abatement systems to reflect the selected effluent flow configuration.

5. The method of claim 1, wherein the selected effluent flow configuration is defined by a user.

6. The method of claim 1, wherein the selected effluent flow configuration is one of a back-up configuration, a redundant configuration, a load balancing configuration, and an application specific configuration.

7. A method for monitoring and controlling one or more abatement systems comprising:
representing on a display one or more abatement systems;
representing on the display one or more effluent flows from processing tools;
receiving a selection indicating a back-up effluent flow configuration, wherein a first subset of the one or more abatement systems is selected as a primary abatement system and a second subset of the one or more abatement systems is selected as a back-up abatement system;
directing the one or more effluent flows to the one or more primary abatement systems;
placing one or more back-up abatement systems in a standby mode; and
configuring an interface manifold to redirect the effluent flow from the one or more primary abatement systems to the one or more back-up abatement systems based on a status of the primary abatement system.

8. The method of claim 7 further comprising: receiving the status of the one or more primary abatement systems that the one or more abatement systems are offline.

9. The method of claim 8 further comprising: representing on the display the updated status of the one or more primary and back-up abatement systems.

10. The method of claim 7, wherein the selection of the one or more abatement systems as either primary or back-up abatement systems is based on one or more parameters.

11. The method of claim 7 further comprising: representing on the display the one or more abatement systems selected as primary abatement systems and the one or more abatement systems selected as back-up abatement systems.

12. The method of claim 7 further comprising: representing on the display one or more channels to deliver the one or more effluent flows to the one or more abatement systems.

13. The method of claim 12 further comprising: representing on the display the one or more channels to deliver the one or more effluent flows to the one or more abatement systems to reflect the selected back-up effluent flow configuration.

14. A method for monitoring and controlling one or more abatement systems comprising:
representing on a display one or more abatement systems;
representing on the display one or more effluent flows from processing tools;
receiving a selection indicating a redundant effluent flow configuration, wherein at least a first abatement system of the one or more abatement systems receives one or more effluent flows from processing tools and at least a second abatement system of the one or more abatement systems receives one or more effluent flows from processing tools; and configuring an interface manifold to redirect the one or more effluent flows from an off-line abatement system to an operational abatement system based on the status of the offline abatement system.

15. The method of claim 14 further comprising: receiving status indicating that at least one of the first and second abatement systems has gone off-line.

16. The method of claim 15 further comprising: representing on the display the updated status of the one or more operational and off-line abatement systems.

17. The method of claim 14 further comprising: representing on the display one or more channels to deliver the one or more effluent flows to the one or more abatement systems.

18. The method of claim 17 further comprising: representing on the display the one or more channels to deliver the one or more effluent flows to the one or more abatement systems to reflect the selected redundant effluent flow configuration.

19. A method for monitoring and controlling one or more abatement systems comprising:
representing on a display one or more abatement systems;
representing on the display one or more effluent flows from processing tools;
receiving a selection indicating a load-balancing effluent flow configuration; and
configuring an interface manifold to direct the one or more effluent flows to the one or more abatement systems based on at least one efficiency criteria.

20. The method of claim 19 further comprising: representing on the display one or more channels to deliver the one or more effluent flows to the one or more abatement systems.

21. The method of claim 19 further comprising: representing on the display the selected load-balancing effluent flow configuration.

22. The method of claim 19 wherein each abatement system has an associated operational cost and wherein the efficiency criteria include a least cost for abating a given effluent flow.

23. The method of claim 19, wherein each abatement system has an associated operational cost and wherein the efficiency criteria include a least amount of resources for abating a given effluent flow.

24. The method of claim 19, wherein each abatement system has an associated operational cost and wherein the efficiency criteria include a least amount of time for abating a given effluent flow.

25. A method for monitoring and controlling one or more abatement systems comprising:
representing on a display one or more abatement systems;
representing on the display one or more effluent flows from processing tools;
receiving a selection indicating an application specific effluent flow configuration;
configuring an interface manifold to direct a first effluent flow to a first abatement system, wherein the first effluent flow is from a first process; and
configuring an interface manifold to direct a second effluent flow to a second abatement system, wherein the second effluent flow is from a second process.

26. The method of claim 25 further comprising: representing on the display one or more channels to deliver the one or more effluent flows to the one or more abatement systems.

27. The method of claim 26 further comprising: representing on the display the one or more channels to deliver the one or more effluent flows to the one or more abatement systems to reflect the selected application specific effluent flow configuration.

28. The method of claim 25, wherein the first process is different from the second process.

29. The method of claim 25 wherein the first process is a manufacturing process and the second process is a cleaning process.

* * * * *